G. H. HOUGHTON.
Improvement in Brick-Machines.
No. 129,563. Patented July 16, 1872.
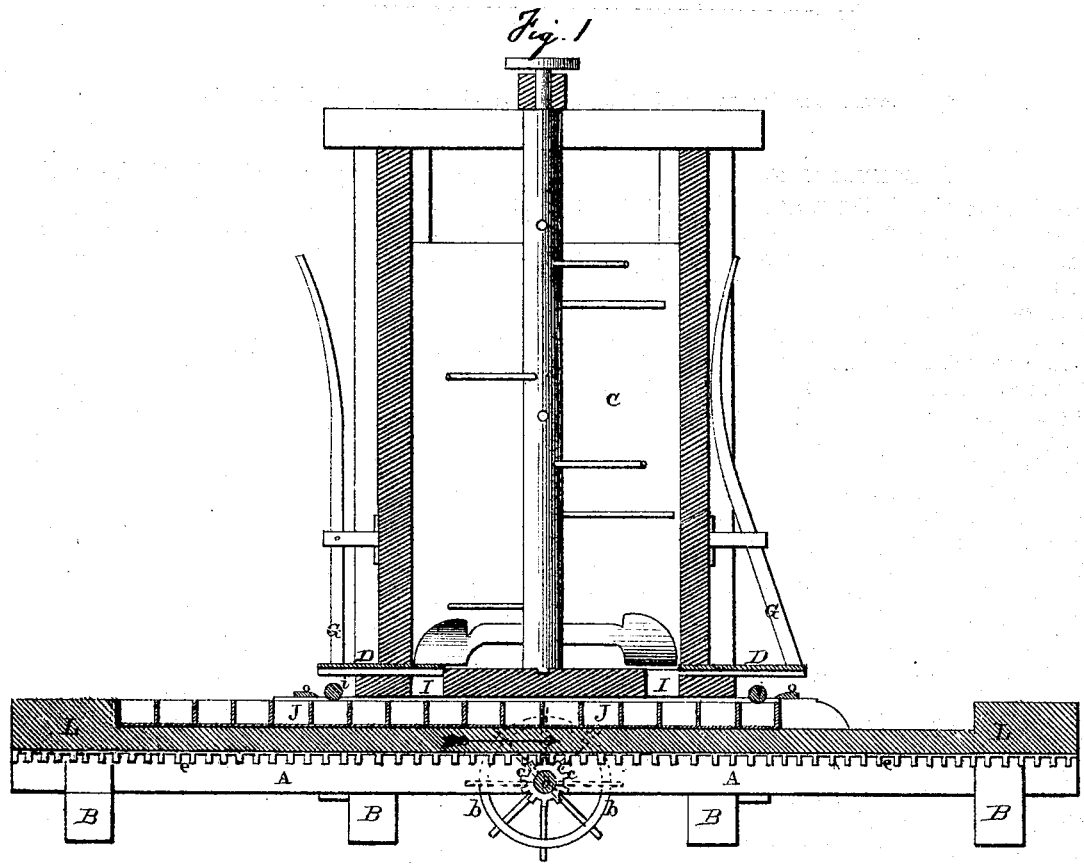
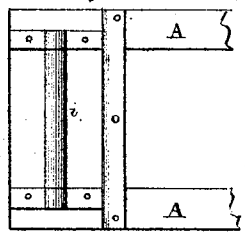
Witnesses.
Henry S. Abbot
Alex T. Davidson
Inventor.
Gideon H. Houghton 129,563

UNITED STATES PATENT OFFICE.

GIDEON H. HOUGHTON, OF MARLIN, TEXAS.

IMPROVEMENT IN BRICK-MACHINES.

Specification forming part of Letters Patent No. 129,563, dated July 16, 1872.

SPECIFICATION.

Be it known that I, GIDEON H. HOUGHTON, of Marlin, in the county of Falls and State of Texas, have invented certain new and useful Improvements in Brick-Machines; and I do hereby declare that the following is a full, clear, and exact description thereof, that will enable others skilled in the art to which it appertains to make and use the same, reference being had to the accompanying drawing and to the letters of reference marked thereon, which form a part of this specification.

The nature of my invention consists in the arrangement, with the molds, of one or more valves or flood-gates in the bottom of the pug-mill, for the purpose of controlling the flow of the clay into the molds, and a roller and knife upon each side of the mill for pressing the clay into the molds and dressing the tops of the bricks, as will hereafter be more fully set forth.

Figure 1 is a vertical section of my machine, and Fig. 2 is a plan view of the knife and roller.

A represents the bed-frame, which rests upon the ground-sills B, and which is of any convenient size or shape. Upon the top of this frame is placed the pug-mill C, which is constructed in the usual manner, and which may be operated by either horse or steam power, as may be desired. In the bottom of this mill, upon opposite sides, there are two valves or flood-gates, D, hinged to suitable levers or other operating devices, G, and which are made to open and close the apertures I, through which the clay is run into the molds J. Extending across the bottom of the frame is a shaft, $a$, having a gear-wheel, $c$, secured to its center, and a hand-wheel, $b$, to one end, by which the gear is operated. Sliding in suitable ways made in the frame, and having a rack-bar, $e$, secured to its under side so as to mesh with the gear $c$, is the slide L, which carries the molds J back and forth under the mill for the purpose of being filled. Secured across the frame, upon each side of the mill, is a roller, $i$, and knife or striker $o$; the roller serving to press the clay firmly and solidly down into the molds so as to make the bricks compact and solid, while the knife skins or cuts off the rough surface from the top, giving the bricks a finished appearance.

The operation of my machine is as follows: The pug-mill being in operation so as to force the clay through the apertures I, the molds J are placed upon the slide L and the hand-wheel $b$ turned in the desired direction so as to send them under the mill to be filled. As but one of the flood-gates or valves D is intended to be used at a time, when the molds are moved toward the right, as indicated by the arrow, the valve on the left will be closed and the other opened. As the molds pass under the apertures I the clay is fed down into them, filling each compartment a little above the level, and as they pass under the roller $i$ this clay is pressed down into the molds as compactly as possible, leaving only the top surface to be cut by the knife $o$ to finish the operation. As soon as the slide L has moved far enough, the filled molds are replaced with empty ones, and the operation is reversed.

Having thus described my invention, what I claim, and desire to secure by Letters Patent, is—

1. The combination, with a pug-mill and sliding valves D, of a roller, $i$, for pressing the clay into the molds, and a knife or striker, $o$, for dressing the tops of the bricks, as set forth.

2. The combination of the pug-mill $c$, valves D, mold-carriage L and molds, roller $i$, and knife $o$, as and for the purpose specified.

In testimony that I claim the foregoing I have hereunto set my hand this 11th day of July, 1872.

GIDEON H. HOUGHTON.

Witnesses:
How. S. ABBOTT,
ALEX. S. DAVIDSON.